Dec. 25, 1928.  R. J. DUNHAM  1,696,295
COMBINATION SPARE TIRE CARRIER AND RIM TOOL
Filed Nov. 17, 1926   2 Sheets-Sheet 1

Inventor
Rex James Dunham
by Bryant + Lowry
Attorneys

Dec. 25, 1928.  R. J. DUNHAM  1,696,295
COMBINATION SPARE TIRE CARRIER AND RIM TOOL
Filed Nov. 17, 1926  2 Sheets-Sheet 2
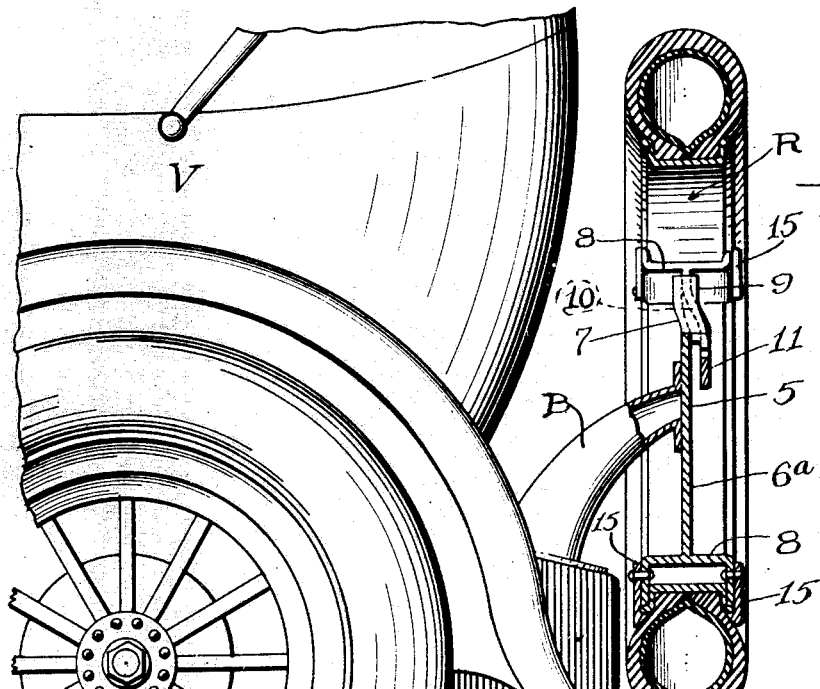
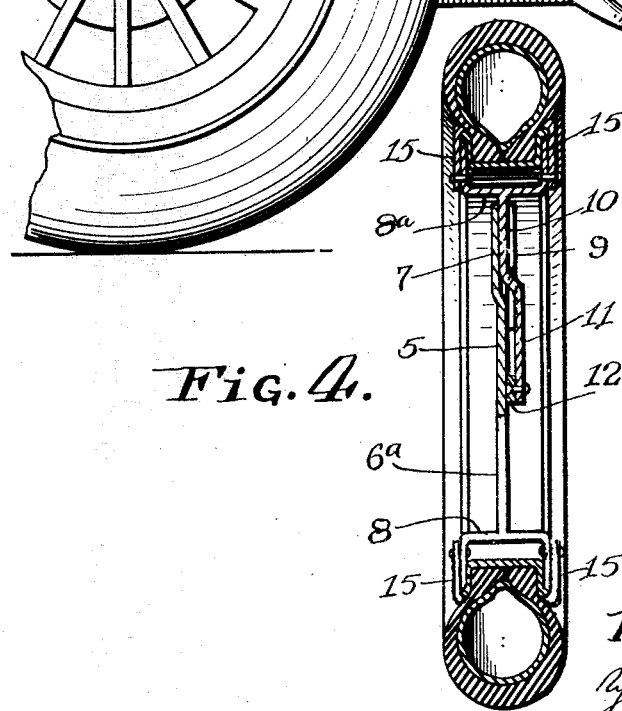
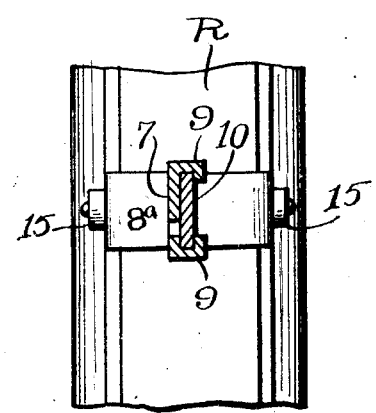
Inventor
Rex James Dunham.
By Bryant & Lowry
Attorneys Patented Dec. 25, 1928.

1,696,295

UNITED STATES PATENT OFFICE.

REX JAMES DUNHAM, OF OSHKOSH, WISCONSIN.

COMBINATION SPARE-TIRE CARRIER AND RIM TOOL.

Application filed November 17, 1926. Serial No. 148,879.

This invention relates to an improved device adapted to be mounted upon a motor vehicle to normally act as a spare tire carrier, but operable for inwardly "breaking" or expanding a transversely split tire carrying rim to facilitate dismounting or mounting of a tire in respect to such rim.

The primary object of the invention is to provide a combined spare tire carrier and rim tool of the above kind which is extremely simple and durable in construction as well as efficient in operation.

A further object is to provide a device of the above kind wherein means is provided for efficiently locking the parts in rim expanding condition to thereby effectively prevent unauthorized removal of a tire carrying rim from the device when the latter is employed as a spare tire carrier.

A still further object is to provide a device of the above kind involving a radially movable element manually operable for effecting the rim breaking and expanding operations, and means positionable for restraining such radially movable element against moving so as to retain the rim in broken or contracted condition or expanded condition, as desired.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a rear elevational view of a combined spare tire carrier and rim tool constructed in accordance with the present invention and operatively associated with a tire carrying rim, the parts being in position with the rim held in contracted or broken condition;

Figure 3 is a vertical section of the device taken substantially upon the line 3—3 of Figure 1 and showing the invention mounted upon the rear end of a motor vehicle;

Figure 4 is a section taken substantially upon line 4—4 of Figure 1; and

Figure 5 is a fragmentary section taken substantially upon line 5—5 of Figure 1.

Figure 1:
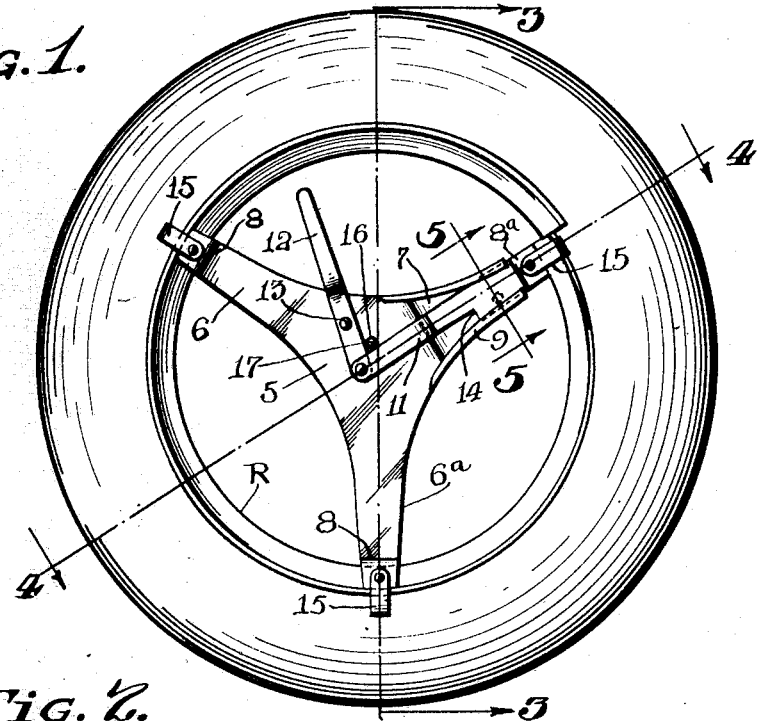

Referring more in detail to the drawings, the present invention embodies a spider-like support, here shown as a stamped piece of rigid sheet metal and comprising a central or body portion 5 provided with equally spaced radial arms 6, 6$^a$ and 7. The arms 6 and 6$^a$ are of similar form and length and have transverse substantially U-shaped rim receiving seats 8 rigid with their outer ends.

The remaining arm 7 is somewhat shorter than the arms 6 and 6$^a$ and has its longitudinal edge portions inturned to form angular guides 9 for a radially movable bar or arm section 10 which is projectable beyond the outer end of arm 7 and has a transverse substantially U-shaped rim receiving seat 8$^a$ rigid with its outer end. The arm section 10 flatly engages the adjacent side of the arm 7 so as to move parallel with the plane of the latter, and rigid with and projecting inwardly from the inner end of the arm section 10 is a bar 11 whose inner end terminates adjacent the center of the plate 5 and is pivoted to the adjacent end of a hand lever 12 having a relatively long free outer arm and a relatively short inner arm. The lever 12 is accordingly pivoted as at 13 near its inner end to the plate 5 so that said hand lever is free to swing in a plane parallel with the plane of the spider or its plate 5 as will be seen upon viewing Figures 1 and 2.

Figure 2:
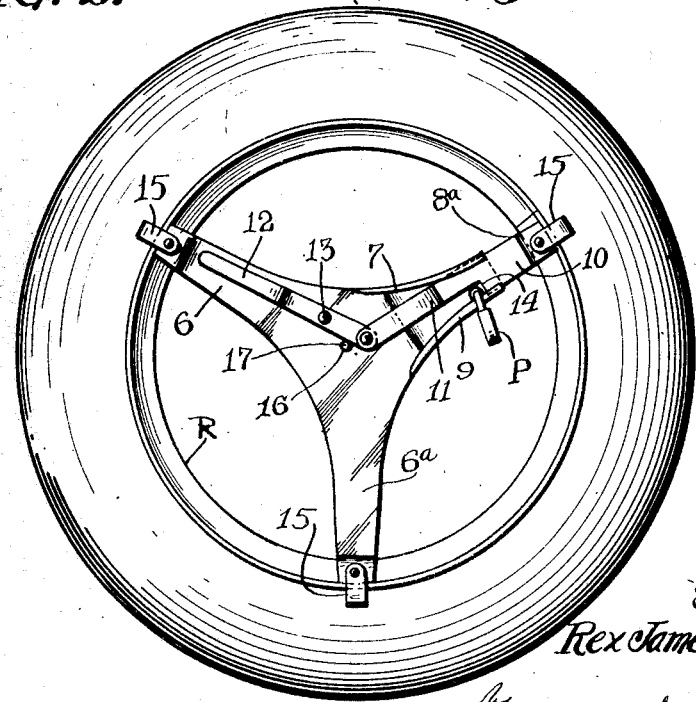
Figure 2 is a view similar to Figure 1 with the parts in rim expanding position and locked in this position to maintain the tire carrying rim against unauthorized removal.

From the foregoing description it will be apparent that when the hand lever 12 is swung upwardly to the position of Figure 1, the arm section 10 and the seat 8$^a$ carried thereby will be retracted or moved inwardly, whereupon the tire carrying rim R may be readily placed into engagement with the seats 8 of the arms 6 and 6$^a$ and disposed in surrounding relation to the seat 8$^a$ of arm section 10. Upon then swinging the hand lever 12 downwardly to the position of Figure 2, the arm section 10 will be forced outwardly for engaging the seat 8$^a$ with the adjacent portion of the rim, at which time, the tire carrying rim will be effectively retained upon the carrier. The lateral movement of the section 11 necessitated by the movement of the short end of the lever 12 in an arcuate path is provided for by the guide flanges 9, which are divergent towards their inner ends, thus allowing the section 11 sufficient lateral play between the guides 9 to accommodate its movement to that of the lever 12. In order to effectively lock the arm section 10 in this outwardly adjusted position so that unauthorized removal of the tire carrying rim will be prevented, the bar 11 is formed as a reduced extension of the arm section 10 so as to present a shoulder at the inner end of the latter as indicated at 14, and the arm 7 is formed with a transverse opening in position to receive the shackle of a padlock P behind said shoulder 14 when the arm section 10 is so positioned or projected. Thus, when the lock shackle is engaged in the opening of the arm 7 behind the shoulder 14, inward movement of the arm section 10 will be prevented until the lock is opened by an authorized person and removed.

Fastened, and preferably pivoted, to the outer side of the radial ends or legs of each of the rim seat members 8 and $8^a$ are inwardly facing hooks 15 which project outwardly beyond the outer ends of said legs of the seat members in position to engage over the side flanges of the rim R when swung to the radial position shown. It is thus evident that when the hooks 15 are engaged over the rim flanges, and the lever 12 is swung to the position of Figure 1, the rim may be contracted or broken as indicated in this figure. This will facilitate dismounting of the tire for repair purposes or the like and replacement of the tire on the rim, whereupon the rim may be readily expanded to the operative condition of Figure 2 upon again swinging the lever to the position of Figure 2, such expansion of the rim being effected by the engagement of the seat members 8 and $8^a$ with the interior of the rim.

Of course, when the device is not employed for contracting or expanding the rim, but is simply used as a tire carrier, the hooks 15 are not required to be in an operative position. For this reason, the hooks 15 are displaceable, either by flexing or otherwise, in an outward direction so that they may be swung to an inwardly projecting radial position entirely inwardly of the outer ends of the legs of the seat members 8 and $8^a$. When the hooks are thus swung to an inoperative inwardly projecting position, it is apparent that they will not interfere with the removal of the rim and tire from the carrier upon sliding the arm section 10 and its seat member $8^a$ inwardly to the position of Figure 1.

The body portion or plate 5 is formed with an opening 16 at a point between the pivot 13 of lever 12 and the pivotal connection of the inner end of lever 12 with the bar 11, and this opening is so arranged as to be at one side of the lever 12 when in a position wherein the seat member $8^a$ is in its innermost position, and to be at the other side of said lever 12 when the latter is positioned so that the seat member $8^a$ is in its outermost position. Thus, the seat member $8^a$ may be retained in either extreme position by preventing movement of the lever 12 through the medium of a suitable stop pin removably inserted in the opening 16 as indicated at 17. This use of pin 17 will eliminate the necessity of the user from manually retaining the lever 12 in either desired position.

As shown in Figure 3, the present device is well adapted for being mounted in a vertical position at the rear end of a motor vehicle V as is generally usual with spare tire carriers. In this instance, a bracket B carried by the vehicle projects upwardly and rearwardly and is fixed to the center of the plate or body portion 5 of the carrier at the side opposite that at which the lever 12 and other parts are positioned. In this way, the device will be supported in proper position and in such manner as to be conveniently and effectively employed for dis-mounting and mounting a tire in respect to a rim when desired.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In a combined spare tire carrier and rim tool, a mounting plate provided with radial arms, one of said arms including a radially and laterally movable outer arm section having a rim seat on its outer end, further rim seats rigid with the outer ends of the remaining arms, and manually operable means for moving said movable outer arm section including an operating lever pivoted to the mounting plate, rim flange engaging hooks carried by the sides of the rim seats positionable to project outwardly for use in contracting a rim, and means associated with said lever for releasably holding the movable arm section in either its outer or inner limit of movement.

2. In a combined spare tire carrier and rim tool, a mounting plate provided with radial arms, one of said arms including a radially and laterally movable outer arm section having a rim seat on its outer end, further rim seats rigid with the outer ends of the remaining arms, and manually operable means for moving said movable outer arm section including an operating lever pivoted to the mounting plate, rim flange engaging hooks carried by the sides of the rim seats positionable to project outwardly for use in contracting a rim, and means associated with said lever for releasably holding the movable arm section in either its outer or inner limit of movement, said hooks being further positionable to project inwardly out of the path of the rim when the latter is being placed on or removed from the carrier.

In testimony whereof I affix my signature.

REX JAMES DUNHAM.